(12) United States Patent
Townson et al.

(10) Patent No.: US 9,016,772 B2
(45) Date of Patent: Apr. 28, 2015

(54) FRONT FASCIA SUPPORT STRUCTURE AND A VEHICLE COMPRISING THE SAME

(71) Applicant: GM Global Technology Operations LLC, Detroit, MI (US)

(72) Inventors: James M. Townson, Clarkston, MI (US); Alexander C. Winter, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/069,922

(22) Filed: Nov. 1, 2013

(65) Prior Publication Data

US 2014/0132035 A1 May 15, 2014

Related U.S. Application Data

(60) Provisional application No. 61/725,025, filed on Nov. 12, 2012.

(51) Int. Cl.
*B60J 7/00* (2006.01)
*B62D 25/08* (2006.01)
*B29D 99/00* (2010.01)

(52) U.S. Cl.
CPC .......... *B62D 25/084* (2013.01); *B29D 99/0053* (2013.01); *B62D 25/085* (2013.01)

(58) Field of Classification Search
CPC ..... E04D 13/158; E04D 13/076; G07F 19/20; G07F 19/205; B44C 3/12; A61L 27/18; A61B 17/0469; A61B 2017/0472; A61B 17/0401; C08L 83/04

USPC .................. 296/193.1, 187.01; 52/96, 60, 11; 293/120, 121, 155

See application file for complete search history.

(56) References Cited

U.S. PATENT DOCUMENTS

| | | | |
|---|---|---|---|
| 5,628,536 A * | 5/1997 | Fulkerson | 293/117 |
| 6,205,638 B1 * | 3/2001 | Yustick | 29/464 |
| 6,357,821 B1 * | 3/2002 | Maj et al. | 296/193.09 |
| 6,443,608 B1 * | 9/2002 | Storck et al. | 362/523 |
| 6,527,333 B2 | 3/2003 | Hewitt et al. | |
| 6,663,150 B1 * | 12/2003 | Evans | 293/120 |
| 6,736,434 B2 * | 5/2004 | Anderson et al. | 293/102 |
| 6,913,300 B2 * | 7/2005 | Mori et al. | 293/120 |
| 6,997,490 B2 * | 2/2006 | Evans et al. | 293/120 |
| 6,998,174 B2 * | 2/2006 | Porter et al. | 428/318.8 |
| 7,114,587 B2 * | 10/2006 | Mori et al. | 180/68.3 |
| 7,303,219 B2 * | 12/2007 | Trabant et al. | 293/155 |
| 7,438,348 B2 * | 10/2008 | Nakamae et al. | 296/187.04 |
| 7,766,111 B2 | 8/2010 | Guilfoyle et al. | |

(Continued)

*Primary Examiner* — Kiran B Patel
(74) *Attorney, Agent, or Firm* — Cantor Colburn LLP

(57) ABSTRACT

A fascia support structure for a vehicle includes a top portion, the top portion comprising a substantially U-shaped body comprising a top fascia support member, a first side fascia support member and a second side fascia support member, the first side fascia support member having a first side baffle, the second side fascia support member having a second side baffle. The structure also includes a bottom portion attached to the first side fascia support member and the second side fascia support member, the bottom portion comprising a bottom baffle and an integrated locking structure disposed on a surface. A front fascia for a vehicle includes a viewable surface and an opposed structural surface, the structural surface comprising an integrated locking member, the integrated locking member configured for interlocking mating engagement with a fascia support structure.

8 Claims, 13 Drawing Sheets

(56) References Cited

U.S. PATENT DOCUMENTS

| | | | |
|---|---|---|---|
| 7,896,409 B2* | 3/2011 | Abdelnour et al. | 293/115 |
| 7,988,225 B2* | 8/2011 | Goldsberry | 296/193.09 |
| 8,157,303 B2* | 4/2012 | Fortin | 293/115 |
| 8,196,998 B2 | 6/2012 | Ohno et al. | |
| 8,807,895 B2* | 8/2014 | Brown | 411/112 |
| 8,863,886 B2* | 10/2014 | O'Brien et al. | 180/309 |
| 2007/0182174 A1 | 8/2007 | Nakayama et al. | |
| 2008/0157566 A1 | 7/2008 | Tazaki et al. | |
| 2009/0267364 A1* | 10/2009 | Crainic et al. | 293/117 |
| 2010/0243351 A1 | 9/2010 | Sakai et al. | |
| 2010/0282438 A1 | 11/2010 | Wirth et al. | |
| 2012/0019025 A1 | 1/2012 | Evans et al. | |
| 2012/0110909 A1 | 5/2012 | Crane et al. | |
| 2013/0068403 A1 | 3/2013 | Fenchak et al. | |
| 2014/0059859 A1* | 3/2014 | Townson et al. | 29/897.2 |
| 2014/0061407 A1* | 3/2014 | Townson et al. | 248/205.1 |
| 2014/0062136 A1* | 3/2014 | Townson et al. | 296/191 |
| 2014/0191538 A1* | 7/2014 | Townson et al. | 296/193.09 |
| 2014/0208602 A1* | 7/2014 | Townson et al. | 33/600 |

* cited by examiner

FRONT FASCIA SUPPORT STRUCTURE AND A VEHICLE COMPRISING THE SAME

CROSS-REFERENCES TO RELATED APPLICATIONS

This patent application claims priority to U.S. Provisional Patent Application Ser. No. 61/725,025 filed Nov. 12, 2012, which is incorporated herein by reference in its entirety.

FIELD OF THE INVENTION

The subject invention relates to vehicles, particularly to a front fascia support structure for a vehicle having an integrated locking structure disposed thereon and a front fascia having an integrated locking member disposed thereon, and more particularly to a vehicle assembly comprising a positioning and reinforcement structure, a position-controlled front fascia support structure having an integrated locking structure disposed thereon and a front fascia having an integrated locking member disposed thereon.

BACKGROUND

Vehicles, such as automobiles, are assembled by aligning and fastening numerous components and sub-assemblies to one another. One region of the automobile requiring assembly of such components and sub-assemblies is a front end region. This portion of the vehicle is frequently assembled as an assembly or subassembly referred to as a "front clip." The front clip is commonly defined as the assembly comprising the portion of the vehicle extending from the A-pillar (the roof support pillar associated with the front windscreen) to the most forwardly disposed component, typically a front bumper. The front clip includes a structural frame, as well as a variety of vehicle components that collectively form the vehicle body.

Several efforts to directly or indirectly mount and/or fix the vehicle body components to each other, as well as to the vehicle frame, have relied on welded support structures or frames and machined body mounting locations for the body components. Approaches relying on such body mounting locations have undesirably led to large variations in alignment and fastening of components to each other. These large variations may influence the aesthetic appearance of the automobile to a user by providing nonuniform or undesirably large or small gaps and spacings between components and may be the cause of functional deficiencies, such as undesirable large opening/closing efforts, misalignment and mutilation of components due to interference, non-uniform gaps and spacings, which each may affect consumer satisfaction.

One area of concern in the front clip has been the positioning of the front fascia and the grill opening therein. In addition, another area of concern has been the ability to create an efficient airflow path from the grill opening to the radiator and cooling system and into the engine compartment. These are very important due to their influence on vehicle fit and finish, aesthetic appeal and perceived vehicle quality, as well as their influence on and contribution to airflow over the vehicle and through the grill opening, which in turn affects the aerodynamic drag and drag coefficient of the vehicle and its vehicle fuel efficiency. For example, an inefficient airflow path and losses of the airflow through the grill and grill opening between the opening and the cooling system may affect the sizing of the grill opening (e.g. require a larger opening) and increase the drag coefficient. Controlling the airflow path can be particularly complicated when front fascias are employed, since they generally include many complex curved surfaces that make it difficult to define an efficient airflow path. This has generally been accomplished using various combinations of airflow closeouts and masticated rubber baffles which must in turn be incorporated into, and accurately positioned within, the front end clip. While these can be effective they add to cost and afford the opportunity for variability in position, which can affect variability in the efficiency of the airflow path and vehicle performance.

Accordingly, it is desirable to provide improved support and positioning of the front fascia and grill opening and to improve the efficiency of the airflow path and reduce airflow losses through the grill opening to improve vehicle fit, finish and performance.

SUMMARY OF THE INVENTION

In one exemplary embodiment, a fascia support structure for a vehicle is disclosed. The structure includes a top portion, the top portion comprising a substantially U-shaped body comprising a top fascia support member, a first side fascia support member and a second side fascia support member, the first side fascia support member having a first side baffle, the second side fascia support member having a second side baffle. The structure also includes a bottom portion attached to the first side fascia support member and the second side fascia support member, the bottom portion comprising a bottom baffle and an integrated locking structure disposed on a bottom surface.

In another exemplary embodiment, a front fascia for a vehicle is disclosed. The fascia includes a viewable surface and an opposed structural surface, the structural surface comprising an integrated locking member, the integrated locking member configured for interlocking mating engagement with a fascia support structure.

In yet another exemplary embodiment, a vehicle is disclosed. The vehicle includes a fascia support structure, comprising: a top portion, the top portion comprising a substantially U-shaped body comprising a top fascia support member, a first side fascia support member and a second side fascia support member, the first side fascia support member having a first side baffle, the second side fascia support member having a second side baffle, and a bottom portion attached to the first side fascia support member and the second side fascia support member, the bottom portion comprising a bottom baffle and an integrated locking structure disposed on a surface thereof. The vehicle also includes a front fascia comprising a viewable surface and an opposed structural surface, the structural surface comprising an integrated locking member, the integrated locking member configured for interlocking mating engagement with the integrated locking structure.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
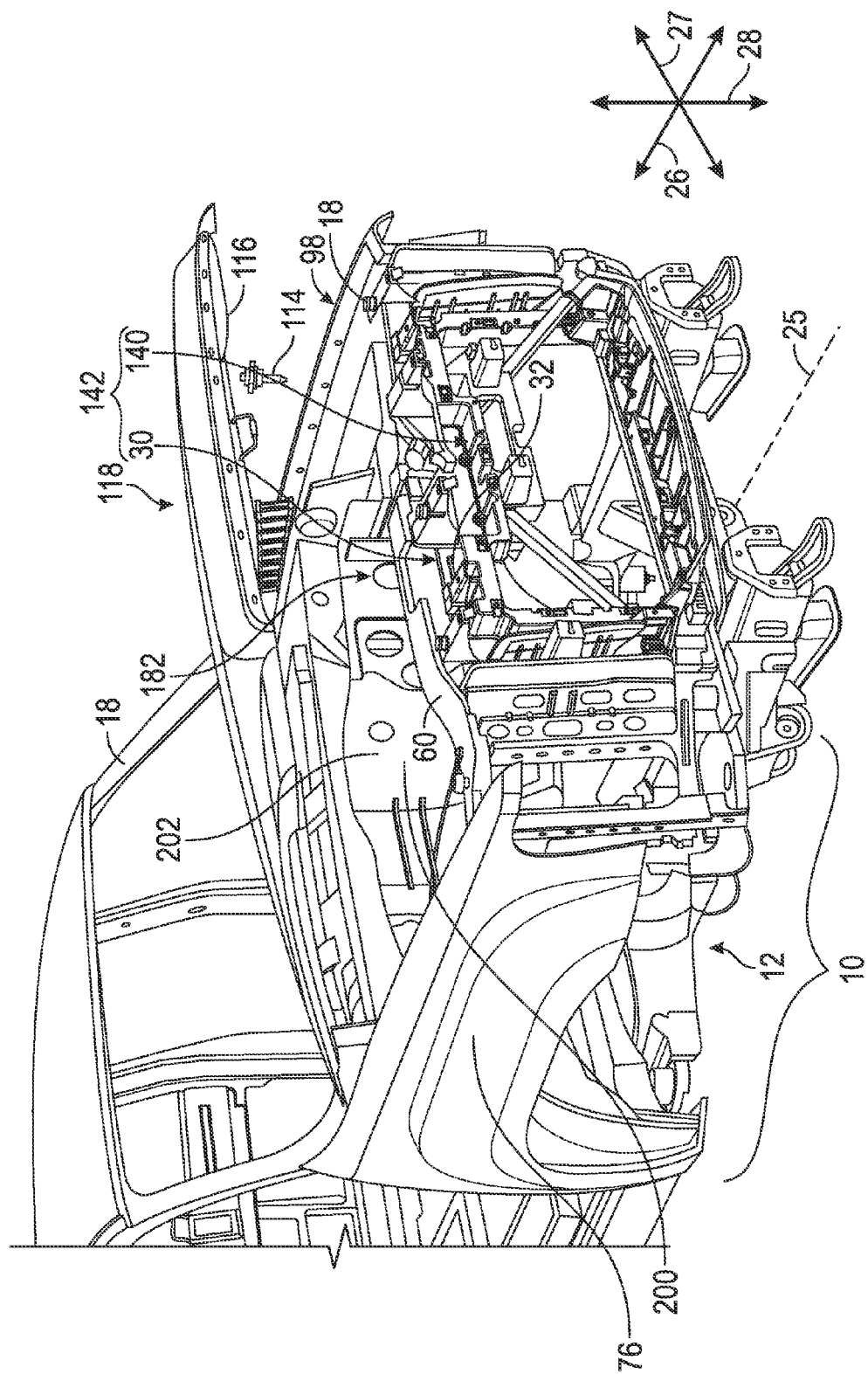
FIG. 1 is a perspective view of an exemplary embodiment of a front end assembly as disclosed herein.

The following description is merely exemplary in nature and is not intended to limit the present disclosure, its application or uses. It should be understood that throughout the drawings, corresponding reference numerals indicate like or corresponding parts and features.

Referring to FIGS. 1-16, and more particularly FIGS. 1-8, a front fascia support structure 140 is disclosed. The front fascia support structure 140 may also be referred to herein interchangeably as a shutter body 140, as it also may be used to provide a support and attachment structure for a shutter frame assembly, as described further herein. The front fascia support structure 140 includes seal members 144 that may be integrally formed on leading edges thereof that are configured to seal against an inner or rearward-facing structural surface 174 of a front fascia 170, FIGS. 8-10 to form an efficient airflow path 178, FIG. 4, from a grill opening 172 to a radiator 180 and cooling system and into the engine compartment 182. The front fascia support structure 140 is also assembled to a positioning and support member 30 using position reference features 132 and attachment features 134 that are formed on the structure and/or the member, as described herein. This provides a position-controlled front fascia support structure assembly 142 that enables precise and repeatable positioning of the front fascia 170 and the grill opening 172 therein, and that provides a very desirable vehicle fit and finish, aesthetic appeal and perceived vehicle quality. In addition, the position-controlled front fascia support structure assembly 142 provides an efficient, low-loss airflow path from the grill opening 172 to the radiator 180 and cooling system and into the engine compartment, including the engine air intake system. This is very advantageous as the efficient airflow path 178 improves the airflow 100 over the exterior surfaces of the vehicle and through the grill opening, which in turn reduces the aerodynamic drag and drag coefficient of the vehicle and increases the vehicle fuel efficiency. The front fascia support structures integrally formed seal members 144 incorporate dual-shot injection molding technology to facilitate a seal around the perimeter 173 of the grill opening 172 between the front fascia support structure 140 and the front fascia 170. Sealing the airflow 100, FIG. 4, entering the grill opening 172 reduces airflow losses so that the airflow entering the opening is captured and directed through the radiator 180 with minimal losses, increases heat exchange efficiency, and reduces aerodynamic drag. The dual shot injection mold process used on the front fascia support structure 140 includes forming a hard polymer substrate overmolded with a softer polymer seal member 144, FIGS. 9-10. The seal members 144 may include a rubberized or elastomeric material that acts as a seal barrier for aerodynamic drag reduction. The seal members 144 are designed with a specific predetermined interference with the front fascia 170 and predicted or predetermined deformed shape that minimizes placement or assembly efforts while maintaining the interference and contact of these components under potential build variations. The predetermined interference is illustrated, for example, in FIGS. 9 and 10, by the bending of the free ends of the seal members 144 against the rearward-facing structural surface 174 of the fascia 170 upon its assembly to the vehicle 10. The interference provides for the pressed engagement of the seal members 144 of the front fascia support structure 140 and the fascia 170 forming a seal between them. The seal members 144 may be integrated along with the front fascia support structure 140 and aerodynamic shutter system closeout panels to eliminate the need for various discrete adapters and baffles.

Aerodynamic drag reduction improves fuel economy and the increase in the channeled airflow through the engine heat exchangers improves engine cooling efficiency and longevity, thereby enhancing customer satisfaction, complexity reduction and de-proliferation of discrete or loose parts (which reduces part costs), improved fuel economy potential (PQ), improved heat exchanger efficiency (which improves vehicle performance and longevity).

The harder plastic base is overmolded during a secondary tooling operation with a material such as a rubberized plastic or elastomer that is soft and pliable. The soft material is designed with draft to the primary separation direction of the mold tool used to form the front fascia support structure 140 and enables execution (e.g., molding) of two materials in the same mold tool using compatible molding methods, such as two-shot injection molding. Engineered interference of the soft-shot material of the seal members 144 to the front fascia 170 and/or grill (not shown) ensures an appropriate seal-out of air leaks that may otherwise result from air escaping around the typical gaps between the various members of the assembly and losses of airflow 100 that may occur without the use of seal members 144, and which is known to occur in conventional fascia assemblies that do not implement the invention described herein, particularly front fascia support structure 140 and seal members 144.

Referring to FIGS. 1-10, in an exemplary embodiment a front fascia support structure 140 for use in conjunction with a grill opening reinforcement (GOR) member 30 to provide a position-controlled front fascia support assembly 142 is disclosed. The position-controlled front fascia support assembly 142 may also be referred to interchangeably herein as a grill opening reinforcement (GOR) structure or assembly 142. Use of the front fascia support structure 140 in conjunction with the GOR member 30 may advantageously be used to establish a predetermined position of the front fascia 170 and grill opening 172 in an optimal predetermined position and provides a built-in device to establish the optimal position of the front fascia 170 and grill opening 172 relative to other front end components, such as the frame 14, front hood 118 and front fenders 76, 98 and provide a desired combination of the proper function of the grill opening 172 and an aesthetic appearance of the front fascia 170 relative to the other components that comprise the front end assembly 10.

In accordance with an exemplary embodiment of the invention, a portion of a front end assembly 10 of a vehicle 12 is shown in the form of an automobile. Although the vehicle 12 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. In one embodiment, the fascia support is particularly useful in conjunction with an SUV, or a family of SUVs built using a substantially similar vehicle platform, wherein the front fascia 170, grill opening 172, FIG. 4, therein and grill (not shown) that partially encloses the grill opening are used to differentiate various members of the family of SUVs associated with different vehicle brands, for example. The preceding list is merely illustrative and is not intended to be limiting of the numerous automobile or vehicle types that may benefit from the embodiments of the invention.

The vehicle 12 includes a frame 14 formed of several integrally formed or operably coupled components that connect them to provide a structural support configured to directly or indirectly support components and sub-assemblies for the vehicle 12. Supported components and sub-assemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending forward from what is known conventionally as an "A-pillar" to a forward most component, such as a front fascia 170. The front end assembly 10 may be interchangeably referred to as a "front clip" of the vehicle 12.

To facilitate assembly of the front end assembly 10, both with respect to components in relation to each other as well as to the frame 14, a positioning and reinforcement member 30 is included. The positioning and reinforcement member 30 generally refers to a structure configured to provide a foundation for inter-part dimensional relationships during the assembly process for all components of the front end assembly 10, thereby alleviating reliance on a front clip frame and individual machined mounting locations. In one embodiment, the positioning and reinforcement member 30 comprises a grill opening reinforcement (GOR) structure that acts to define and reinforce a grill opening 172. Since the positioning and reinforcement member 30 may be formed as an assembly, it may also be referred to herein as a positioning and reinforcement member assembly 30 or a GOR member assembly. As will be described in detail below, the positioning and reinforcement member 30 and the front fascia support structure 140 include various locators, fastening features, and other critical dimensional relationship interfaces of several components and sub-assemblies. This may include any component and/or assembly/sub-assembly suitable for use in a front end assembly 10 or front clip, particularly fender assemblies 76, 98, headlamps (not shown), grill 176, front fascia 170, hood 118, hood latch (not shown), hood bumpers 18 and radiator support 60, for example. It is to be understood that the preceding list is merely illustrative of the numerous components and sub-assemblies which may be included in the front end assembly 10 and may benefit from the positioning and reinforcement member 30. Exemplary components and sub-assemblies will be described in detail below. As used herein, an axial direction 26 refers to a direction that extends frontward and rearward along a central axis 25 of the vehicle, a cross-car direction 27 refers to a direction that extends laterally or across the vehicle and a vertical direction 28 refers to a direction that extends upwardly and downwardly. In one embodiment, these directions are mutually orthogonal with regard to one another.

Figure 4:
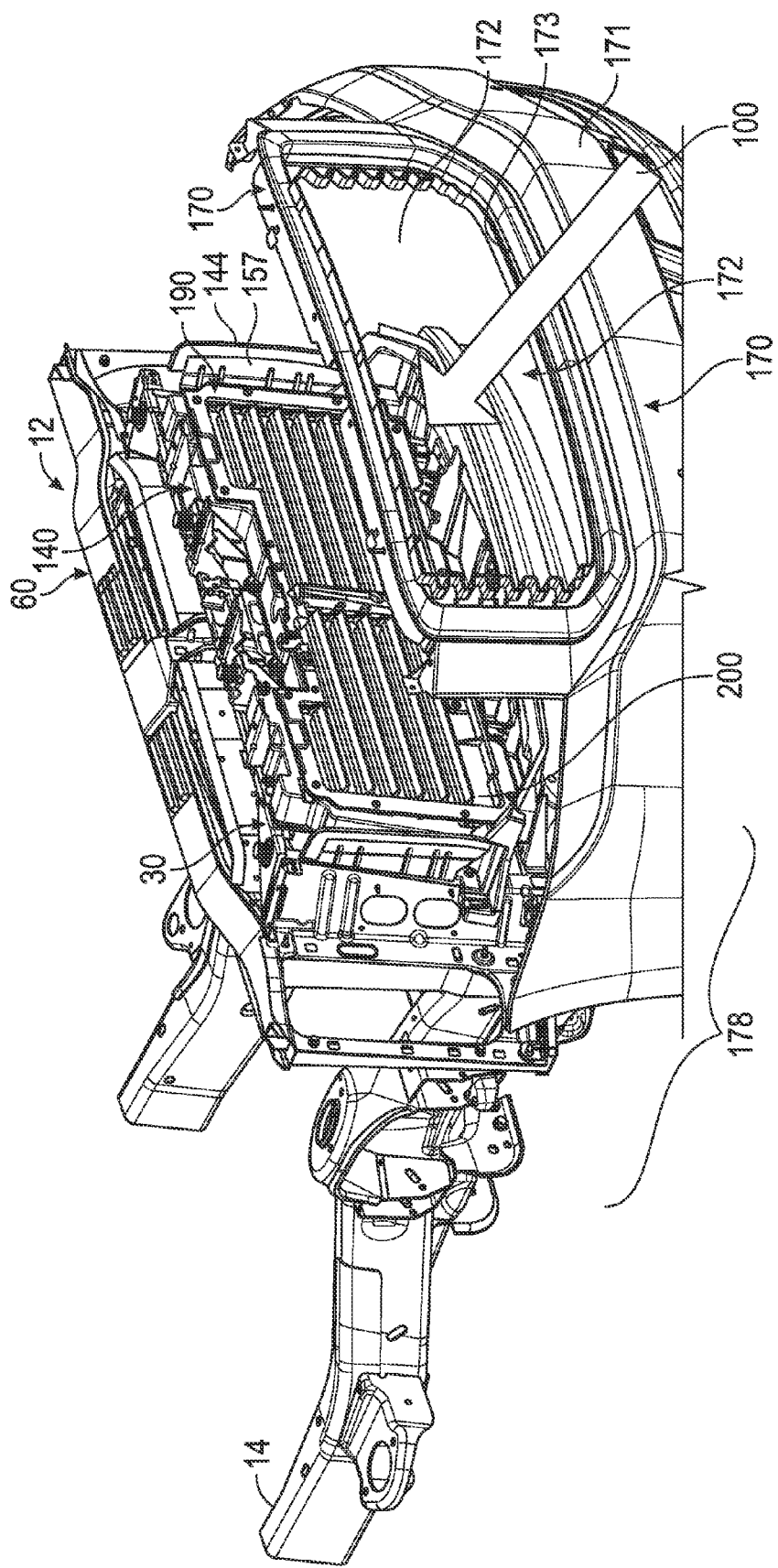
FIG. 4 is a perspective view of the position-controlled front fascia support structure assembly of FIG. 3 and a fascia that is not yet assembled thereto.
Figure 5:
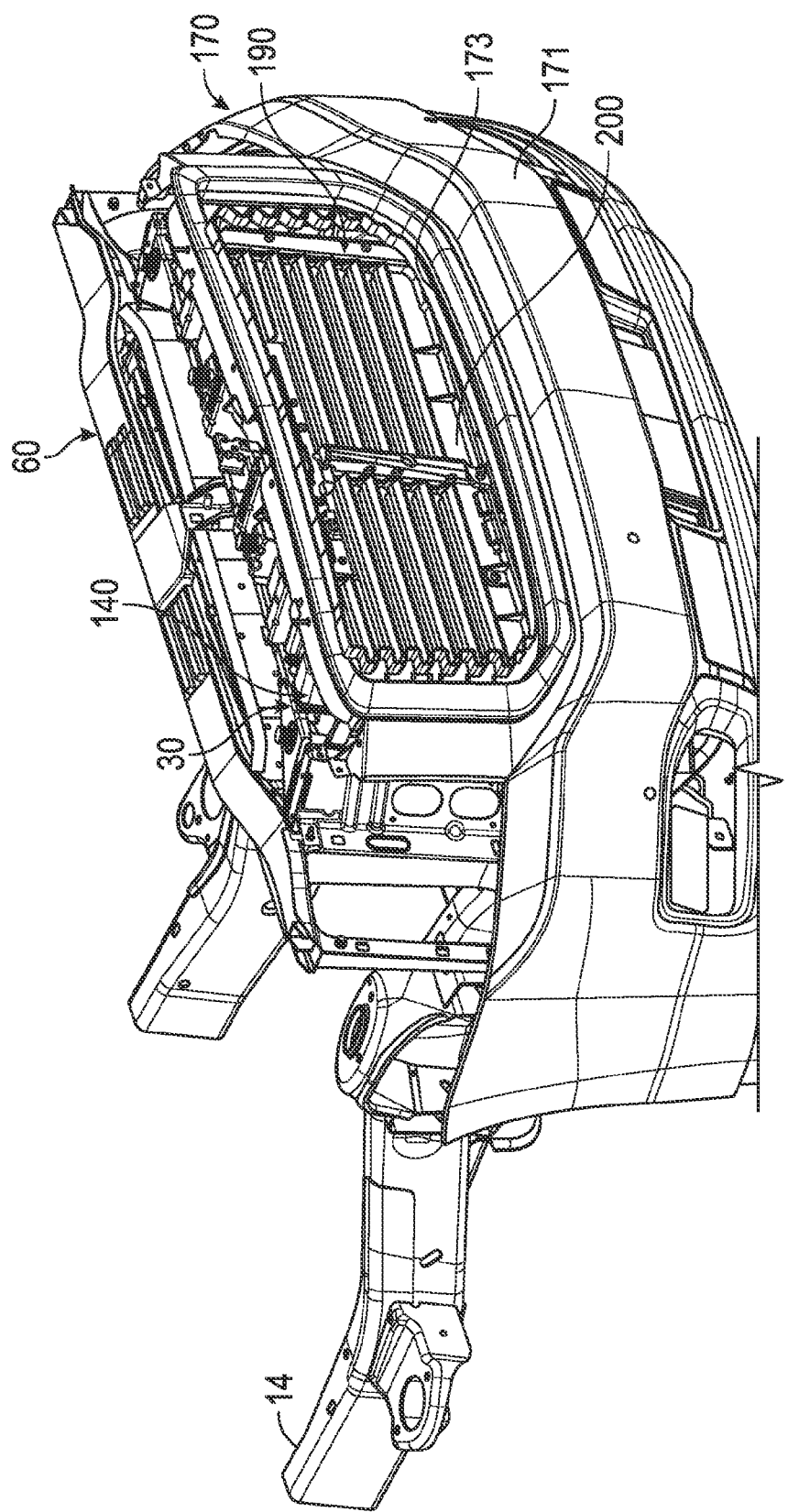
FIG. 5 is a perspective view of the position-controlled front fascia support structure assembly of FIG. 4 having the fascia assembled thereto.
Figure 6:
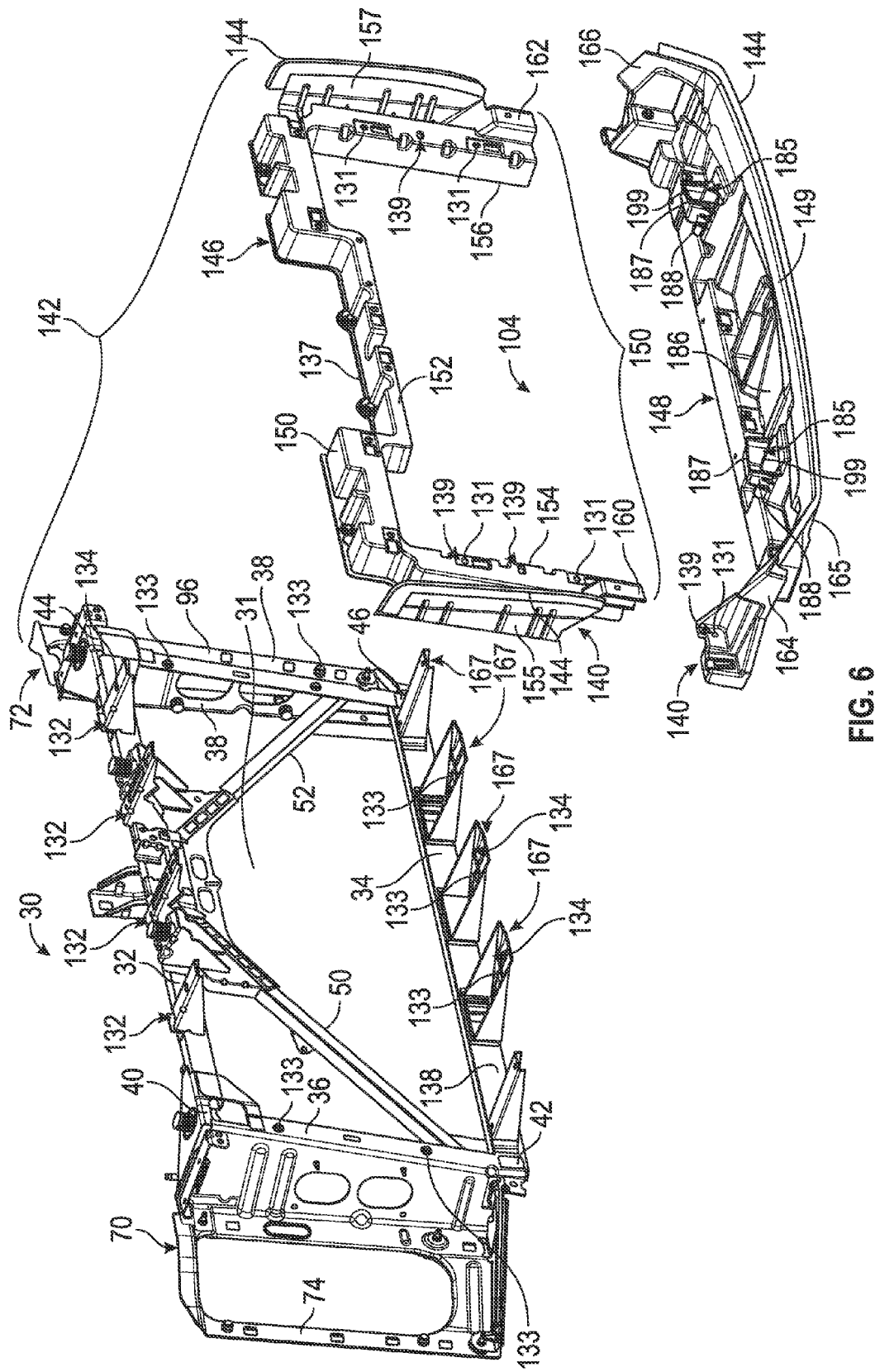
FIG. 6 is a partially disassembled perspective view of an embodiment of a positioning and support structure assembly as disclosed herein, including an exemplary embodiment of a positioning and support member and front fascia support structure as disclosed herein.

Referring now to FIGS. 1-8, and particularly FIG. 6, the positioning and reinforcement member 30 is illustrated in greater detail. The positioning and reinforcement member 30 includes a rectilinearly situated geometry defined by a top support member 32, a bottom support member 34, a first side member 36 and a second side member 38. The top support member 32 and the bottom support member 34 each extend relatively horizontally in a cross-car direction 27 and relatively parallel to each other. The first side member 36 and the second side member 38 extend relatively parallel to each other, but in a relatively vertical 28 direction. As may be understood the positioning and reinforcement member 30 is therefore a substantially cross-car extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form an integral formation process so as to form an integral positioning and reinforcement member 30, such as by casting, laser welding or spot welding process, for example. Alternatively, an operable coupling may facilitate the formation of the positioning and reinforcement member 30 as an assembly, such as by mechanical fasteners, for example. The preceding examples of the precise connections between the top support member 32, the bottom support member 34, the first side member 36 and the second side member 38 are merely illustrative and numerous alternative coupling configurations are contemplated. Furthermore, the above-described components associated with the positioning and reinforcement member 30, as well as those described below, may comprise various materials, such as plastic or a metal. Additionally, the components may be formed as an over-mold having more than one material forming one or more of the components. The positioning and reinforcement member 30 or GOR member may have any suitable size and shape, and may be used, for example, to define and reinforce a grill opening 172, FIG. 4, having any suitable size and shape. The various components of the positioning and reinforcement member 30 may be formed from any suitable material, including various metals, such as various steel or aluminum alloys, engineering plastics, or composite materials, or a combination thereof.

Figure 9:
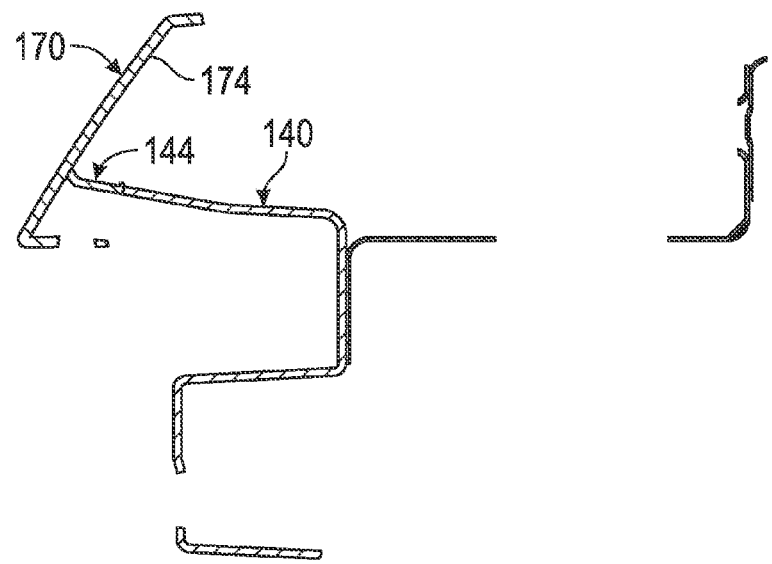
FIG. 9 is a schematic section view of the section 9-9 of FIG. 8.
Figure 10:
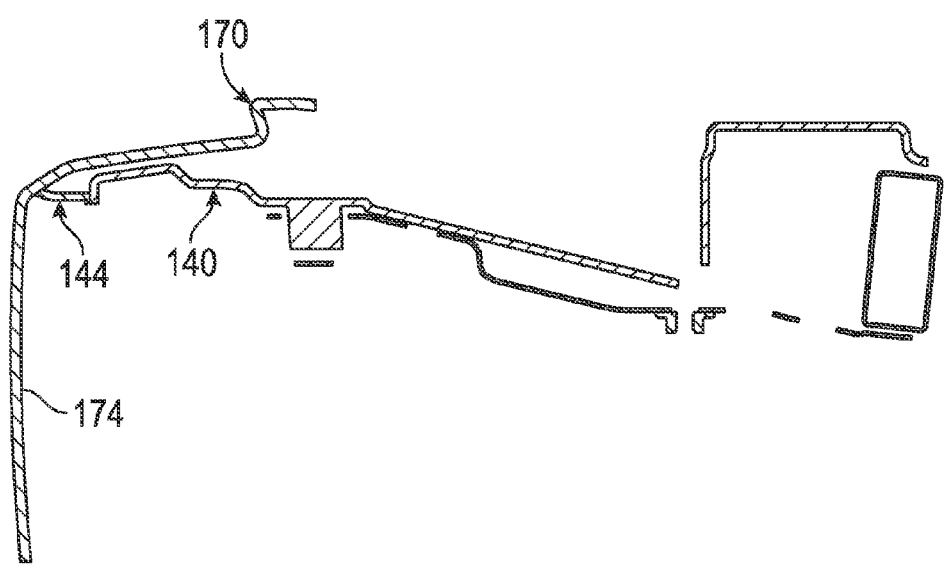
FIG. 10 is a schematic section view of the section 10-10 of FIG. 8.
Figure 11:
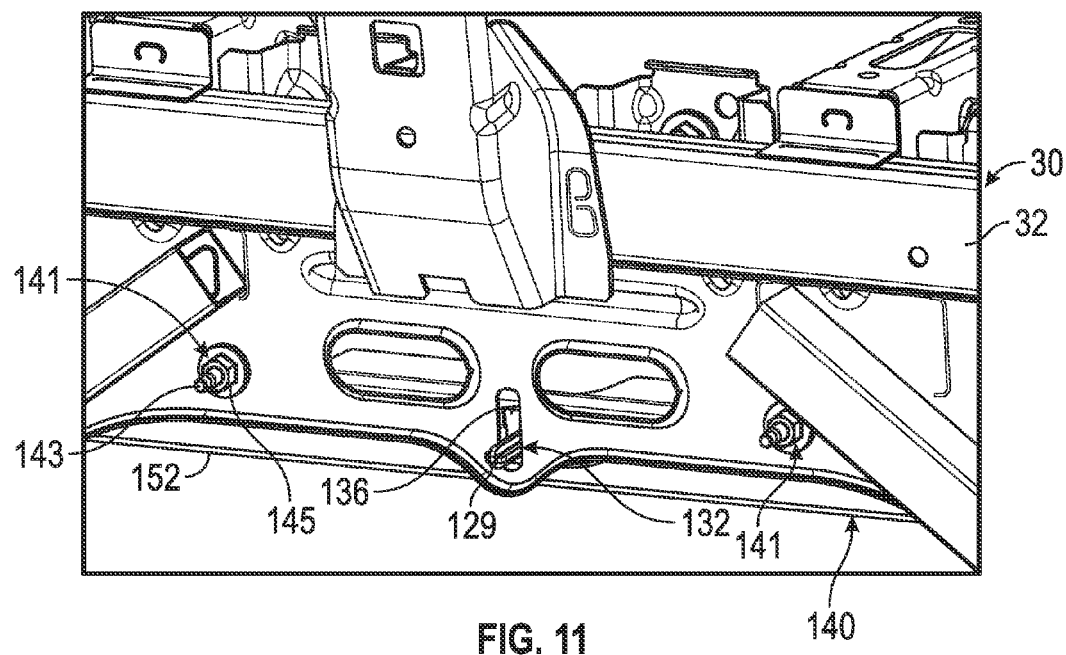
FIG. 11 is a perspective view of an embodiment of the positioning and attachment features of the top portion of the front fascia support structure and positioning and support member as disclosed herein.
Figure 12:
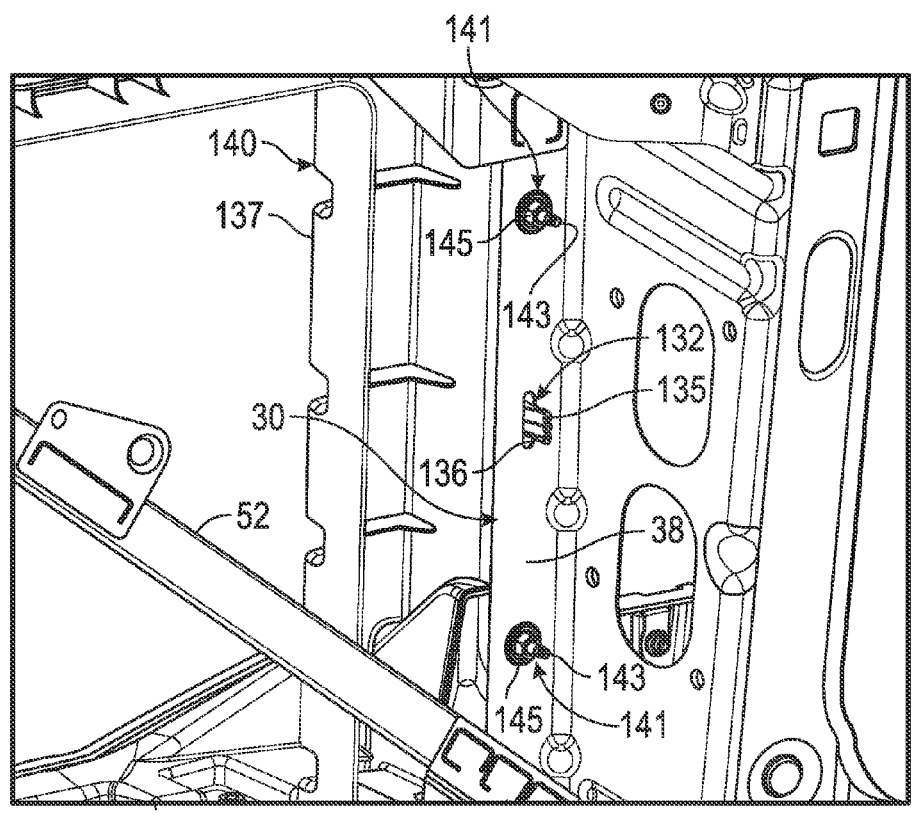
FIG. 12 is another perspective view of the positioning and attachment features of the top portion of the front fascia support structure and positioning and support member as disclosed herein.
Figure 13:
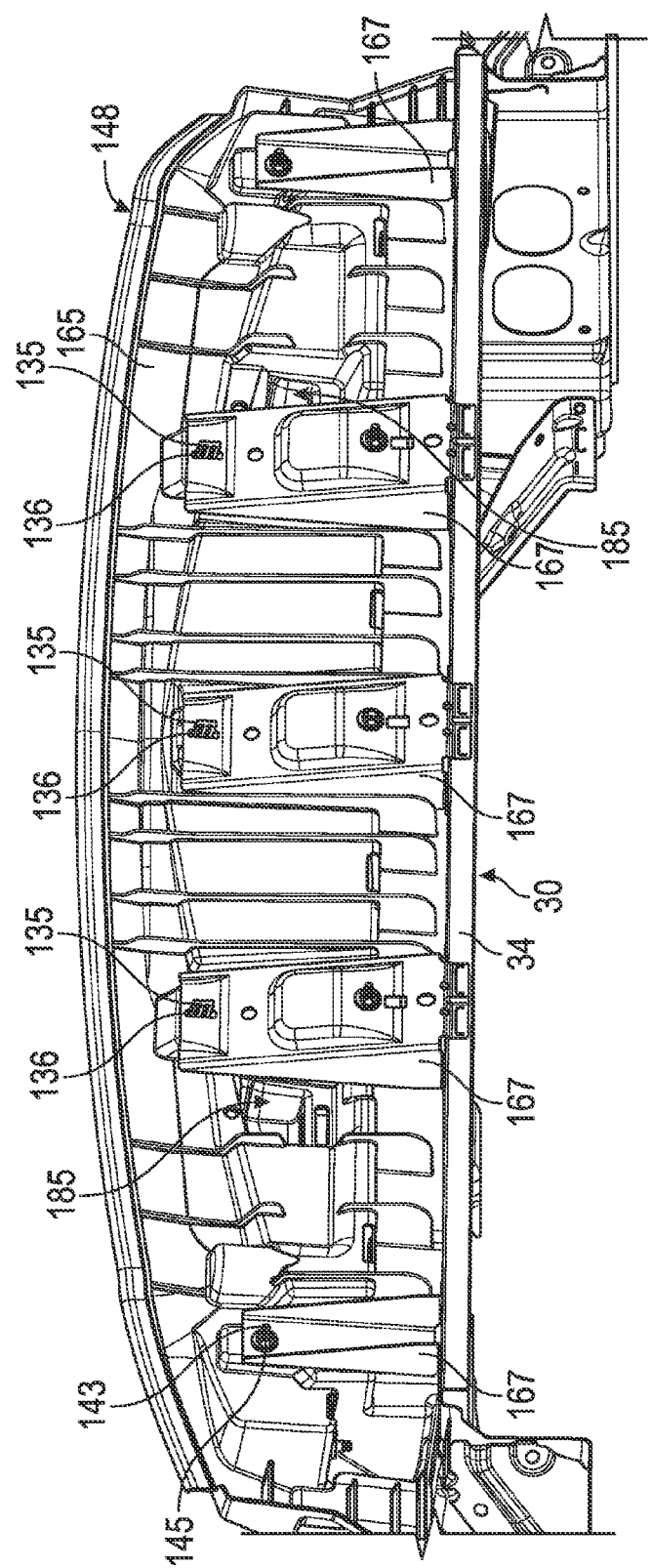
FIG. 13 is a perspective view of the positioning and attachment features of the lower portion of the front fascia support structure and positioning and support member as disclosed herein.
Figure 14:
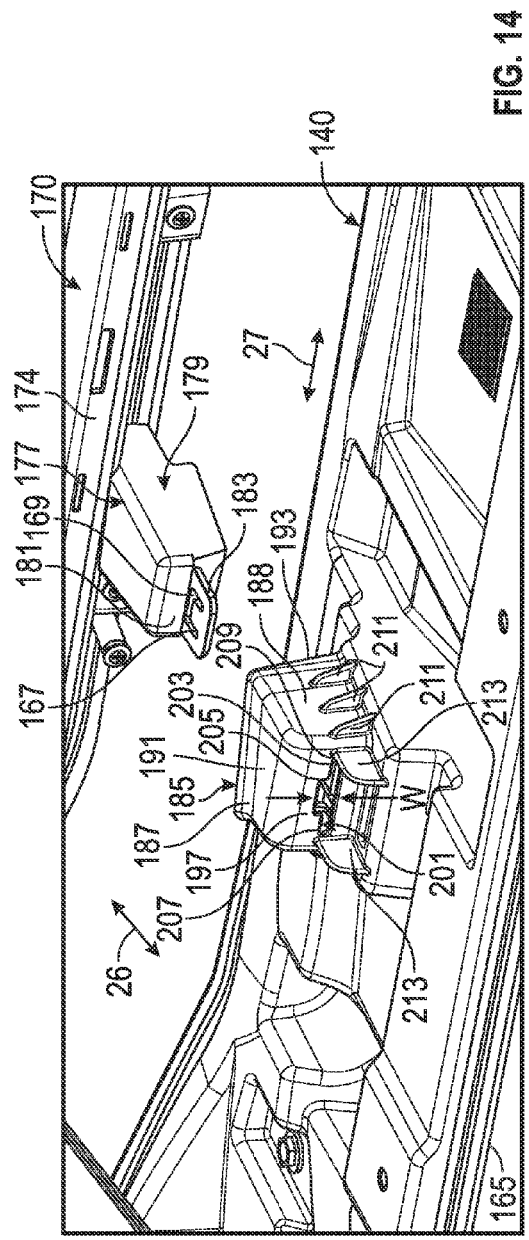
FIG. 14 is a perspective view of an embodiment of a fascia support structure and an integrated locking structure disposed therein and a front fascia comprising an integrated locking member in an unassembled condition and also may be understood to provide an illustration of a released condition of these components from an assembled condition.
Figure 15:
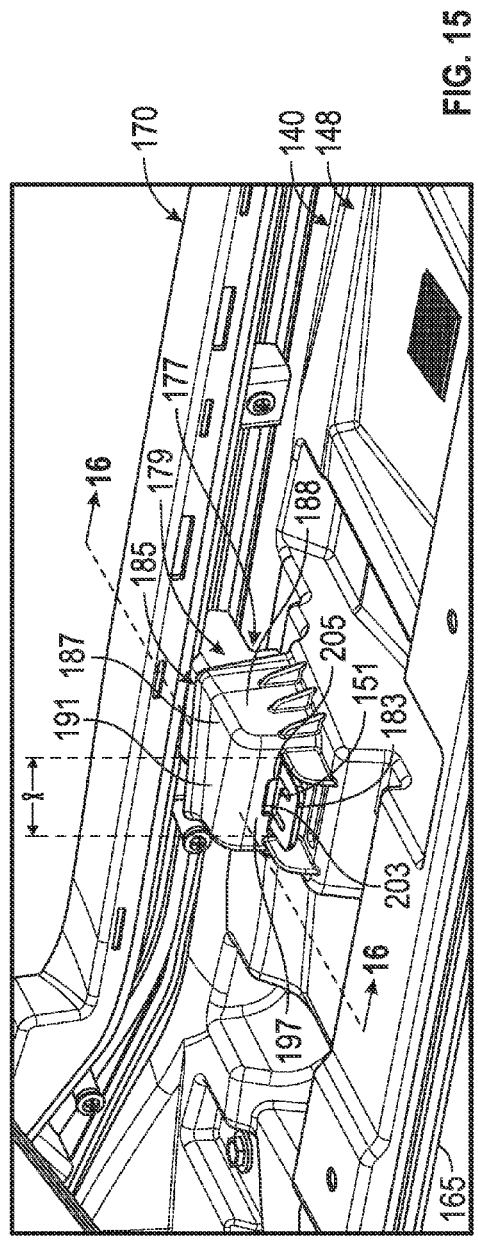
FIG. 15 is a perspective view the embodiment of a fascia support structure and front fascia of FIG. 14 in an assembled and interlocked condition.
Figure 16:
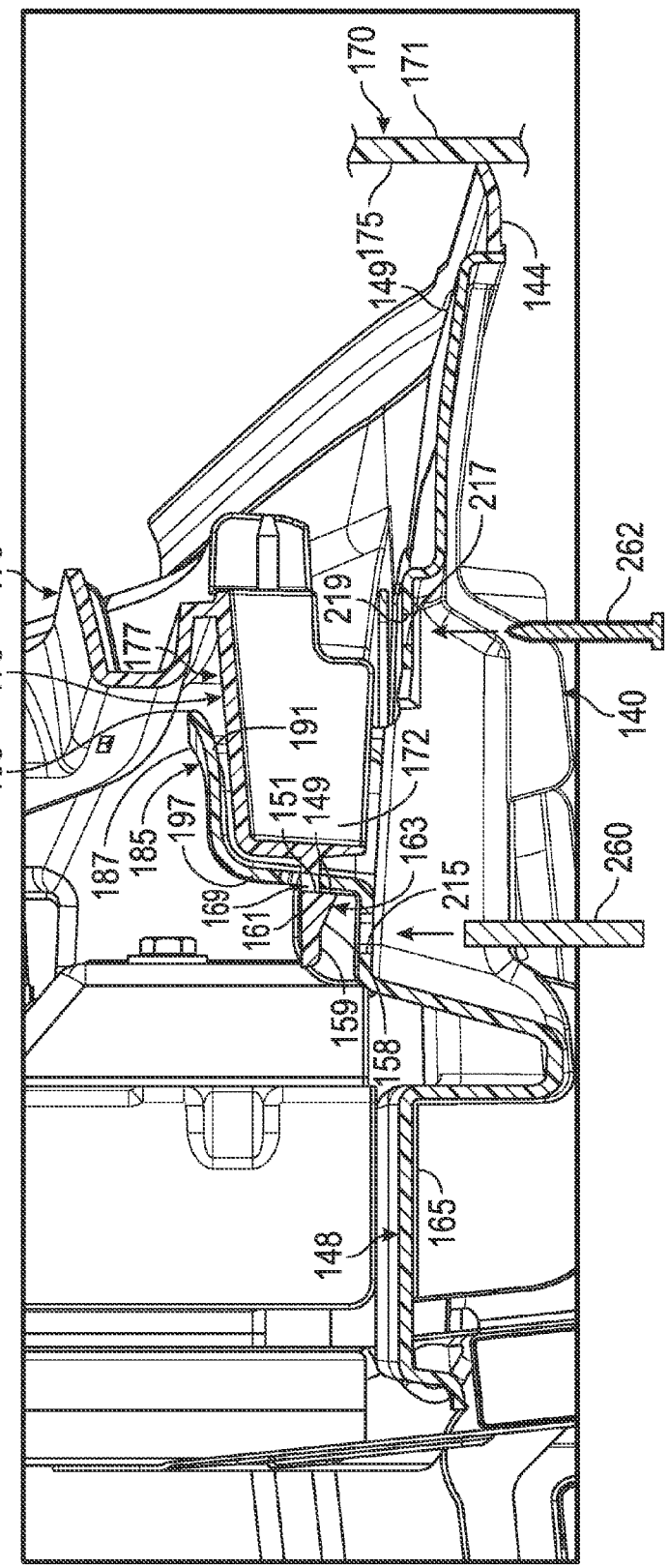
FIG. 16 is a cross-sectional view of section 16-16 of FIG. 15.

Referring to FIGS. 6-13, the positioning and reinforcement member 30 also includes position reference features 132 and attachment features 134 that are formed on or in the member for use in positioning and attaching the front fascia support structure 140 thereto. Any suitable position reference features 132 and attachment 134 features may be utilized. In one embodiment, the position reference features 132 include one or more, and preferably a plurality of, elongated slots 136, FIGS. 11-13, formed in one or more of the top support member 32, the bottom support member 34, the first side member 36 and the second side member 38. The elongated slots 136 may be oriented in any suitable direction, and in one embodiment are oriented with the length or longest portion of the slot or major dimension substantially parallel to the vertical direction 28. Referring to FIGS. 11 and 12, the slots 136, including their major dimension and width of the slot or minor dimension are sized to matingly receive molded elongated tabs 135 or pins 129, including all manner of tubular, solid cylindrical and ribbed pins that are formed on rearward surface 137 of the front fascia support structure 140. The insertion of the mating elongated tabs 135 into the slots 136 positions the front fascia support structure 140 to the datum reference of the positioning and reinforcement member 30 in the cross-car direction 27 and the vertical direction 28. The forward surface 138, FIG. 6, of the positioning and reinforcement member 30 provides a datum reference plane that it substantially perpendicular to the axial direction 26 and seating the rearward surface 137 of the front fascia support structure 140 positions this structure fore/aft in the axial direction 26. Once the positioning and reinforcement member 30 has been positioned relative to the front fascia support structure 140 as described, the members 30 are attached to one another using at least one, and preferably a plurality of, attachment features 134 in the positioning and reinforcement member 30, such as through-holes 133, and at least one, and preferably a plurality of, attachment features 139 in the front fascia support structure 140, such as through-holes 131. The plurality of attachment features 134 in the positioning and reinforcement member 30, such as through-holes 133, and plurality of, attachment features 139 in the front fascia support structure 140, such as through-holes 131 are formed on their respective members in corresponding mating patterns such that when the members are positioned as described the central axes of the holes are aligned with one another and configured to receive an attachment member 141, such as a threaded bolt 143 and nut 145.

The positioning and reinforcement member 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement member 30. Additionally, the first brace 50 and/or the second brace 52 include mounting and locating features corresponding to components integrated with, or associated with, the positioning and reinforcement member 30.

Referring again to FIGS. 6-8, the positioning and reinforcement member 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement member 30 to a first fender assembly 76. The second wing structure 72 includes a second side flange 96 proximate an outermost location of the second wing structure 72 for fixing the positioning and reinforcement member 30 to a second fender assembly 98.

As indicated, the positioning and reinforcement member 30 is used to establish predetermined visual modalities by the positioning and attachment of one or more components of the front end clip or assembly 10, and preferably a plurality of the components of the front end clip, particularly those components that are directly visible, or those components that are not directly visible, but whose position directly or indirectly effects the position of components that are directly visible. The predetermined visual modalities may include positioning various components with various predetermined gaps and spacings, including three-dimensional gaps and spacings, and particularly uniform gaps and spacings.

In one embodiment, shown in FIGS. 1 and 4, this includes providing a modality for establishing a predetermined position (not shown) for the front fascia 170 (FIG. 4), including a position where it is positioned with a uniform, predetermined gap or spacing and a flush appearance relative to the fender assemblies 76, 98 and hood 118 (FIG. 1) by the positioning of reinforcement member 30, particularly as it is joined to the front fascia support structure 140 to form the position-controlled front fascia support structure assembly 142.

Figure 7:
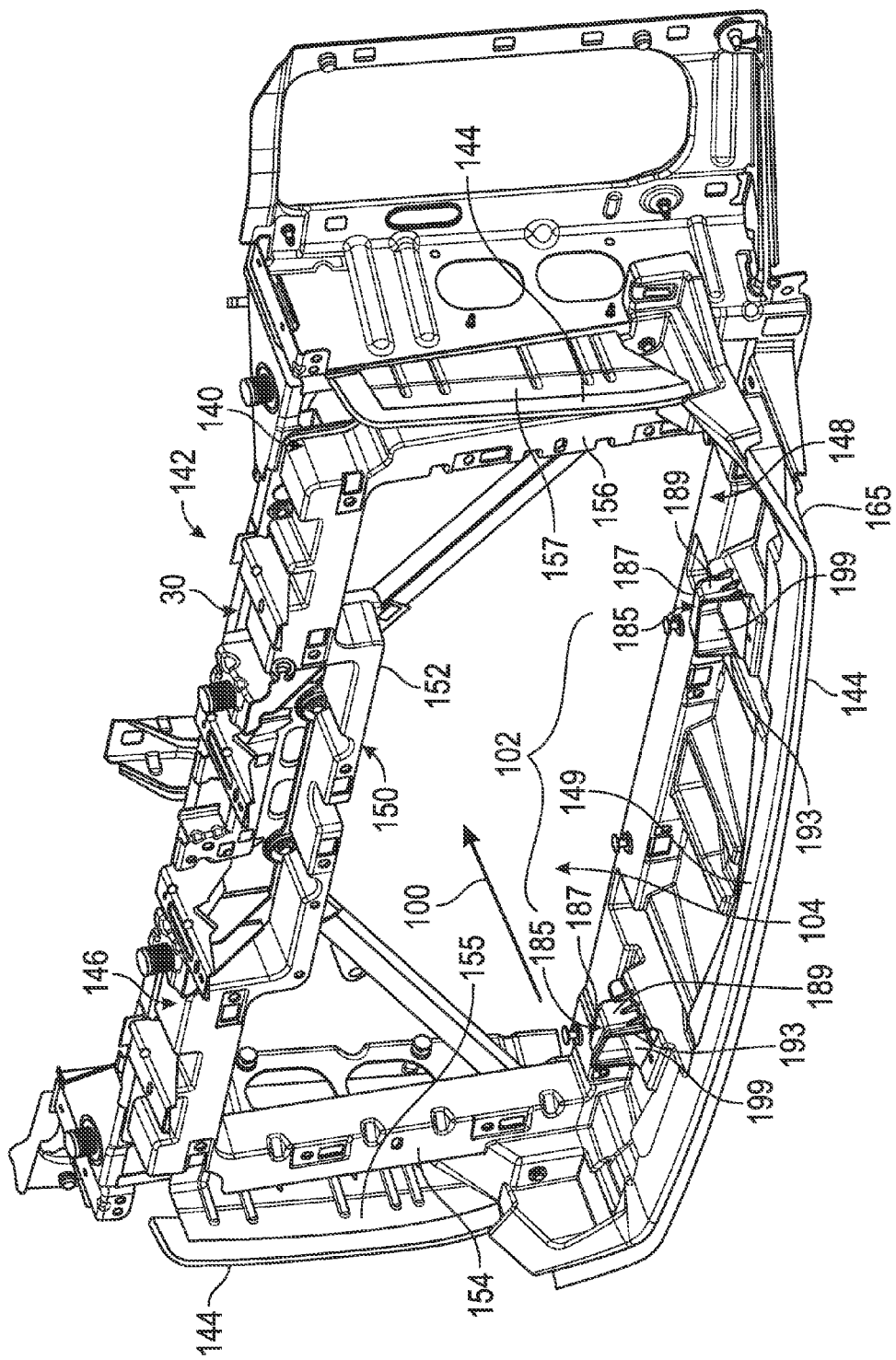
FIG. 7 is a perspective view of a position-controlled front fascia support structure assembly.
Figure 8:
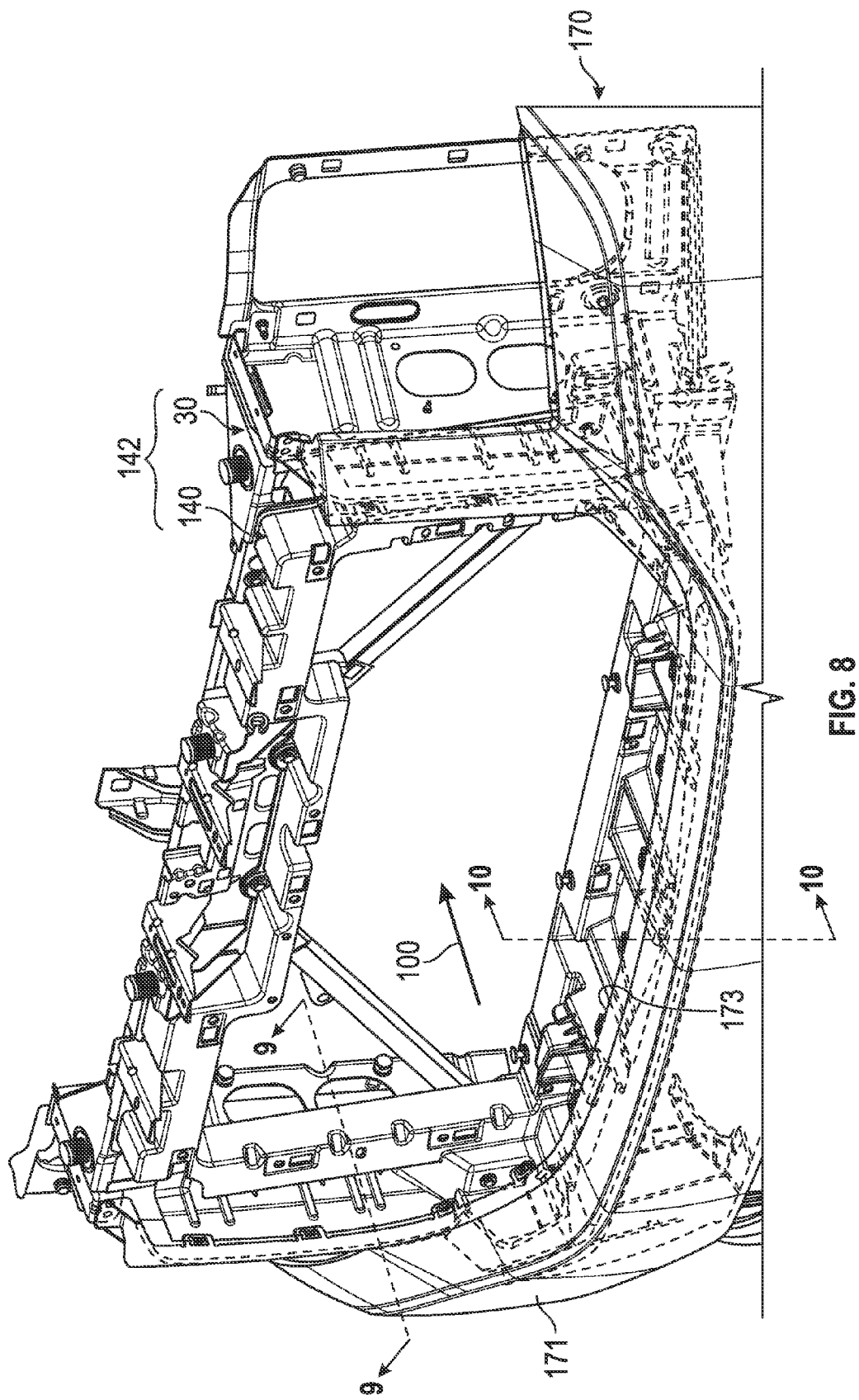
FIG. 8 is a perspective view of the position-controlled front fascia support structure assembly of FIG. 7 further comprising a front fascia disposed thereon.

The front fascia support structure 140 includes a top portion 146 and a bottom portion 148, as shown, for example, in FIGS. 6 and 7. The top portion 146 comprises a substantially U-shaped body 150 comprising a top fascia support member 152, a first side fascia support member 154 and a second side fascia support member 156. The top fascia support member 152 is configured to be joined to the top support member 32 of the positioning and reinforcement member 30 as described and shown in FIGS. 6, 7 and 11. The first side fascia support member 154 is configured to be joined to the first side support member 36 of the positioning and reinforcement member 30 and the second side fascia support member 156 is configured to be joined to the second side support member 38 of the positioning and reinforcement member 30. The bottom portion 148 may be positioned with reference to the positioning and reinforcement member 30 by using forwardly extending brackets 167 attached to the bottom support member 34 that are configured for mating engagement with the elongated tabs 135 formed on the bottom surface 165 of bottom portion 148, FIG. 13. The bottom portion 148 is also designed to rest on and be supported by the forwardly extending brackets 167 and attached to the attachment features 134 in the form of through holes 133 using threaded bolts 143 and nuts 145, as shown, for example, in FIG. 15. The first side fascia support member 154 has a first side baffle 155 that partially encloses the portion of the airflow path 178, FIG. 4, proximate thereto. The second side fascia support member 156 has a second side baffle 157 that partially encloses the portion of the airflow path 178, FIG. 4, proximate thereto. The top portion 146 and bottom portion 148 may be formed as separate components as shown, for example, in FIG. 6. Referring to FIGS. 6-8 and 13-16, the bottom portion 148 is disposed below the top portion 146 and encloses the open end of the substantially U-shaped top portion 146. The bottom portion 148 includes a bottom baffle 149 that partially encloses the portion of the airflow path 178, FIG. 4 proximate thereto. The bottom portion 148 also includes an integrated locking structure 185 disposed on the top surface 186. The integrated locking structure 185 comprises an integral part of the bottom portion 148, and in one embodiment where the bottom portion 148 comprises a molded part, the integrated locking structure 185 is an integral molded feature of the part. It will be understood that while the locking structure 185 is described with reference to and as being disposed on the top surface 186, that features of the integrated locking structure 185 may also appear on and comprise the bottom surface 165. In one embodiment, the integrated locking structure 185 comprises a plurality of spaced apart housings 187 disposed on the top surface 186. Each of the housings 187 comprises a pair of opposed upstanding sidewalls 188 joined by a top wall 191 that extends between them from an inlet end 193 to an outlet end. The housings 187 also include an outlet end wall 197 that is joined to the side walls 188 and the top wall 191. The sidewalls 188 and the top wall 191 define and include an inlet opening in the inlet end 193. The outlet end wall 197 includes an outlet opening 201 and the wall and the opening comprise a female locking feature that is configured to receive the fascia in interlocking engagement, as described herein. In one embodiment, the outlet opening 201 comprises a slot 203 that extends between the sidewalls 188. In one embodiment, the slot 203 has a length (l) (FIG. 14) and a width (w) with the length being greater than the width, the width being greater in a central portion 205 of the slot 203 than at opposing ends 207, 209 thereof. This configuration of the slot 203 is adapted to receive an interlocking mating element of the fascia 170, as described herein. In one embodiment, each upstanding sidewall 188 has at least one rib 211 extending from the sidewall to the bottom surface 165 of the bottom portion 148 proximate the housing 187. The ribs 211 act as strengthening and stiffening members to reinforce the sidewalls 188 and resist forces against them in, for example, the cross-car direction 27 transmitted by the mating members of the fascia 170. In one embodiment, each outlet end wall 197 has at least two ribs 213 extending from the outlet end wall to the bottom surface 165 of the bottom portion 148 proximate the housing 187, the at least two ribs are disposed proximate opposing ends of the slot 203. The ribs 213 act as strengthening and stiffening members to reinforce the outlet end wall 197 and resist forces against it in, for example, the fore/aft direction 26 transmitted by the mating members of the fascia 170. In one embodiment, the integrated locking structure 185 includes a tool access bore 215, FIG. 16, that extends through the bottom portion 148 proximate the outlet end wall 197 of each of the housings 187. The tool access bore 215 configured for upward insertion of a release tool 260, such as a screwdriver, that is configured to release the locking engagement of the fascia 170 as described herein. In one embodiment, the bottom portion 148 includes a boss 217, FIG. 16, disposed in the bottom surface 165 within each housing 187, the boss configured to receive a threaded fastener, such as a self-tapping screw 262. The boss 217 may have any suitable configuration including an open bore 219, as well as a blind bore (not shown).

In one embodiment, at least one of the first side baffle 155, second side baffle 157 and/or bottom baffle 149 has a seal member 144 disposed on a leading or forward-most edge thereof. In another embodiment, seal members 144 are disposed on the leading edge of the first side baffle or close-out panel 155, the leading edge of the second side baffle or close-out panel 157, and the leading edge of the bottom baffle or close out panel 149. The seal members 144 are configured to provide a seal by pressed engagement against the inner or rearward-facing structural surface 174 of the front fascia 170.

The seal members 144 may be disposed on the leading edge of the first side baffle 155, the leading edge of the second side baffle 157, and the leading edge of the lower baffle 148 in any suitable manner. In one embodiment, for example, the seal members 144 may be molded separately and attached as discrete components to the leading edges of the respective baffles 155, 157, 148. Alternately, the baffles may be formed, such as by molding, and the seal members 144 may be over-molded onto the leading edges of the respective baffles 155, 157, 148 in a separate molding operation. In yet another embodiment, the baffles 155, 157, 148 and the seal members 144 may be co-molded and may be made from different materials as a two-shot molding, such as an injection molding, where the baffles 155, 157, 148 and the associated portions of the front fascia support structure 140 are formed from a relatively harder and stiffer material and the seal members 144 are formed from a relatively softer and more compliant material. In one embodiment the top portion 146 comprises an integrally molded first polymer and the seal member 144 is disposed on the leading edge of the first side baffle 155 and the leading edge of the second side baffle 157 as an integrally co-molded second polymer, and the second polymer has a hardness that is less than the first polymer. In another embodiment, the bottom portion 148 comprises an integrally molded first polymer and the seal member 144 is disposed on the leading edge of the bottom baffle 149 as an integrally co-molded second polymer, and the second polymer has a hardness that is less than the first polymer. In one embodiment, the first polymer comprises an engineering thermoplastic or thermoset polymer, or a combination thereof, and the second polymer comprises a thermoplastic or thermoset elastomer, or a combination thereof.

Referring to FIGS. 1-8, the positioning and reinforcement member 30 also includes a positioning and reinforcement structure opening 31, FIG. 6. As discussed above, the position-controlled front fascia support structure assembly 142 also includes a position-controlled front fascia support structure 140, including a top portion 146, the top portion 146 comprising a substantially U-shaped body 150 comprising a top fascia support member 152, a first side fascia support member 154 and a second side fascia support member 156. The second side fascia support member 156 having a second side baffle 157, the top portion 146 attached to at least one of the plurality of position reference features 132 to establish a predetermined position of the top portion 146 relative to the positioning and reinforcement member 30. The bottom portion 148 of position controlled front fascia support structure 140 includes a bottom baffle 149, and at least one of the first side baffle 155, second side baffle 157 and bottom baffle 149 each having a seal member 144 disposed on a leading edge thereof. The bottom portion 148 is attached to at least one of the plurality of position reference features 132 to establish a predetermined position of the top portion relative to the positioning and reinforcement member 30, wherein the first side baffle 155, the second side baffle 157 and bottom baffle 149 defines an airflow conduit 102, FIG. 7, that is configured for fluid communication of an airflow 100 to and through the positioning and reinforcement structure opening 31. The airflow conduit 102 comprises and is defined by the interior surfaces of the various members of the front fascia support structure assembly 142 that define an axially extending central opening 104 therein that is configured to sealingly abut either the positioning and reinforcement member opening 31 directly or another member of the assembly that sealingly abuts this opening.

Referring to FIGS. 1-18, and particularly to FIGS. 4, 5, 8 and 15-18, in one embodiment, the position-controlled front fascia support structure assembly 142 also includes a front fascia 170, FIGS. 9-10, for the vehicle 12, where the front fascia has a grill opening 172 that is in fluid communication with the airflow conduit 102, FIG. 7, and the positioning and reinforcement structure opening 31. The rearward-facing structural surface 174 of the front fascia 170 is sealably disposed on the seal members 144 of the first side baffle 155, second side baffle 157 and bottom baffle 149 proximate the grill opening 172, wherein the seal members reduce or prevent a loss of the airflow 100 from the airflow conduit 102. The front fascia 170 includes a viewable surface 171 and an opposed rearward-facing structural surface 174. The front fascia 170 defines the shape of the front end of the vehicle 12. The rearward-facing structural surface 174 includes an integrated locking member 177, FIGS. 14-16. The integrated locking member 177 is configured for interlocking mating engagement with the fascia support structure 140. In one embodiment, the integrated locking member 177 comprises a member 179 configured for mating disposition within the sidewalls 188 and top wall 191 of the corresponding housing 187. The member 179 having a free end 181. The free end 181 includes an outwardly extending tab 183 disposed thereon. The tab 183 is configured for insertion into and locking engagement with the outlet end wall 197 and, more particularly, into the slot 203 formed in the outlet end wall. In one embodiment, the outwardly extending tab 183 comprises an outwardly opening substantially U-shaped slot 169. The U-shaped slot 169 defines an inwardly extending lockable tab 167. The lockable tab 167 has a locking feature 163 disposed on an upper surface 161 or a lower surface 159 thereof. In one embodiment, the locking feature 163 comprises a barb 158 that tapers outwardly away from the upper surface 161 or the lower surface 159 toward a free end 151 of the inwardly extending lockable tab 167. The barb 158 has an engagement face 149 proximate the free end 151 of the lockable tab 167. The engagement face 149 is configured to engage the outlet end wall 197 of the housing 187 upon the rearward insertion of the tabs 183 into the slots 203 as the fascia 170 is mounted to the fascia support structure 140. The barbs 158 interfere with the edges of the slots 203, causing the tabs 183 and/or the lockable tabs 167 to deflect upwardly until the barbs 158 pass over and snap over the edges of the slots 203 and the engagement faces 149 are in pressed engagement against the portions of the outlet end walls 197 proximate the slots 203. The slot 203 may include an enlarged width (w) in a central portion of the slot to enable the upward deflection of the tabs 183 and/or the lockable tabs 167. The pressed engagement of the engagement faces 149 against the portions of the outlet end walls 197 is caused by a fore/aft biasing force resulting from the rearward-facing structural surface 174 of the fascia 170 coming into pressing engagement against the seal member 144 on the bottom baffle 149 as the fascia 170 is mounted to the fascia support structure 140 and the components are in an assembled condition. The interlocking engagement may be reversed to release the fascia 170 from the fascia support structure 140 by pressing a release tool 260 upwardly until the barb is raised sufficiently to be able to pass forward over the edge of the slot 203. In one embodiment, as described herein, the bottom portion 148 includes a boss 217 disposed in the bottom surface 165 within each housing 187, and the boss is configured to optionally receive a threaded fastener 262, such as a self-tapping screw. The fastener 262 may be used to secure the assembly of the fascia 170 to the fascia support structure 140 in the event that one or more of the tab 183, lockable tab 167 or barb 158 has been broken off or removed, for example, or to enhance their interlocking engagement. The integrated locking structure 185 of the fascia support member 140 and the integrated locking member 177 of the fascia 170 provide unique locating and securing features for structural stability and dimensional and positional relationship of the fascia 170 on the vehicle 12, since they both may be positioned using the datum reference of the positioning and reinforcement member 30. It advantageously reduces the number of required fascia support components. It also decouples the fit of the front fascia 170 and fascia support structure 140 from the chassis and bumper system and provides a positive net location of the fascia and grill to the positioning and reinforcement member 30, which also provides positive net location of the fascia and grill to other components of the front clip as described herein. The integrated locking structure 185 of the fascia support member 140 and the integrated locking member 177 of the fascia 170 support the grill opening and provide the ability to easily remove and service the fascia for repair or replacement while assuring the proper positioning and location of the repaired or replacement fascia.

Figure 2:
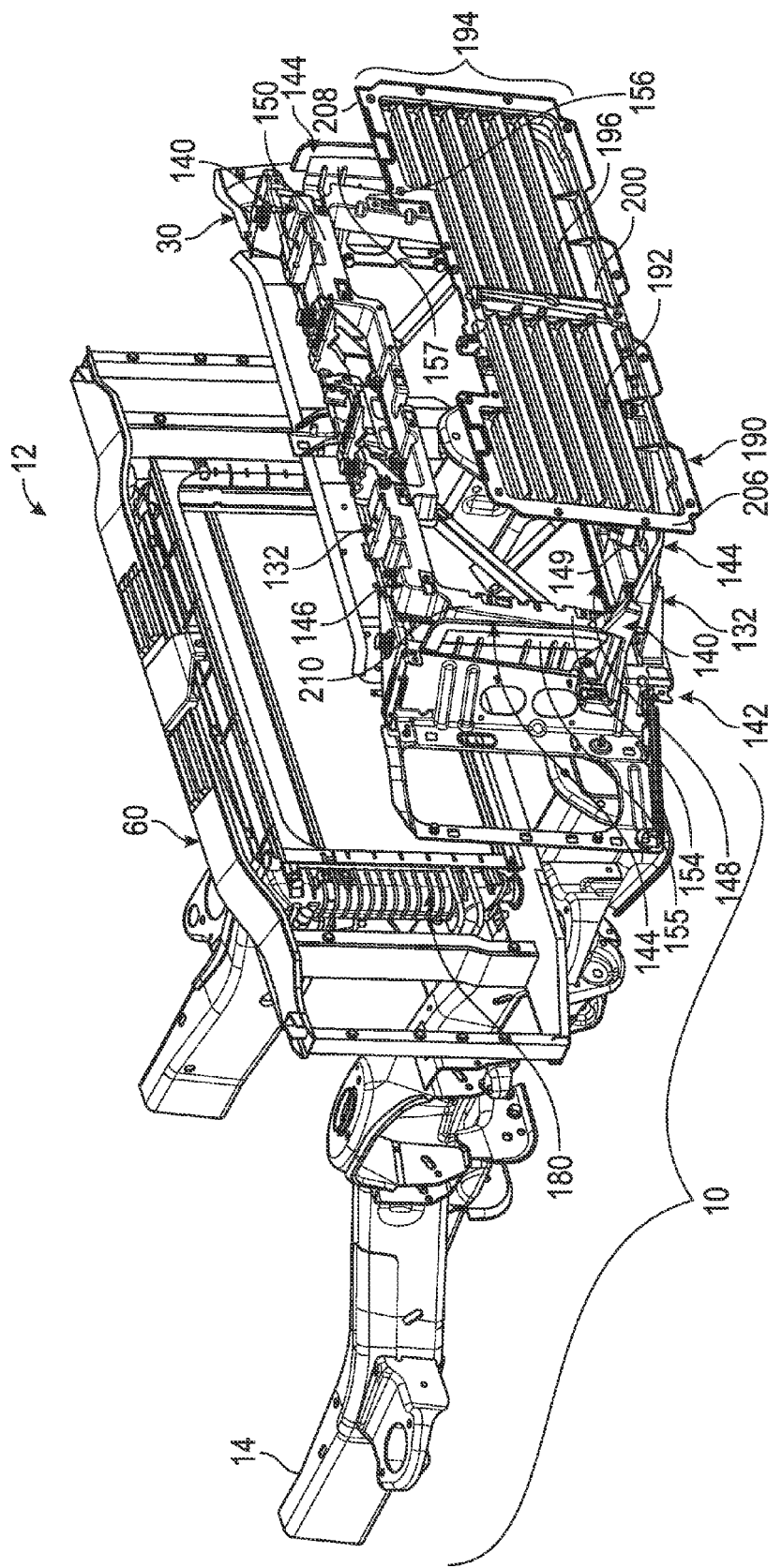
FIG. 2 is a perspective view of a partially assembled position-controlled front fascia support structure assembly as disclosed herein, wherein the radiator is attached to the radiator support and the front fascia support structure is assembled to the positioning and support structure to form an assembly thereof and an aero-shutter system that is not yet assembled thereto.

In one embodiment, the position-controlled front fascia support structure assembly 142 also comprises a housing or shutter box for a selectively adjustable aerodynamic shutter system 190, FIG. 2. The selectively adjustable aerodynamic shutter system 190 includes a plurality of movable (rotatable) shutters 192 that extend in the cross-car direction 27 and are configured for movement between an open position (FIGS. 2-5) where the shutters and the shutter faces 196, FIG. 2, are oriented substantially parallel to the central axis 25 of the vehicle and a closed position (not shown) where the shutters and the shutter faces are oriented substantially parallel to the vertical direction 28. In the closed position, the airflow 100, FIG. 4, into the grill opening 172 is partially blocked except for the portions of the airflow 100 that pass through any permanently open portions of the selectively adjustable aerodynamic shutter system 190, such as the lower opening 200. In closed position the shutters 192 restrict and reduce airflow 100 through the grill opening into the engine compartment 202, FIG. 2. In the open position, the airflow 100 into the grill opening 172 is not restricted by the shutters 192. The selectively adjustable aerodynamic shutter system 190 may also be used to move the shutters 192 to various partially open positions (not shown) between the closed position and the open position to meter or control the quantity or amount of the airflow 100 entering the grill opening 172. The shutters 192 are selectively moveable using a DC motor (not shown) and their position may be controlled using an electronic control module (not shown). The rotatable shutters 192 are linked together by one or more linkages (not shown) that interconnect the shutters 192. The shutters 192 may have any suitable size, including a predetermined length, thickness and width necessary or desirable to close the desired portion of the grill opening 172. The position-controlled front fascia support structure assembly 142 also includes a frame 206 that supports the ends of the rotatable shutters 192. The selectively adjustable aerodynamic shutter system 190, including the frame 206 and the shutters, may be made from any suitable material, including a various thermoset polymers, thermoplastic polymers, metals, or composites materials, or a combination thereof. The rear surface 208 of the frame 206 of the selectively adjustable aerodynamic shutter system 190 may be mounted (FIGS. 2 and 3) to a shutter mounting surface 210 of the position-controlled front fascia support structure. Once the selectively adjustable aerodynamic shutter system 190 has been mounted it comprises a portion of the conduit 102, FIG. 7, for the airflow 100.

In one embodiment, the position-controlled front fascia support structure assembly 142 may also include a grill (not shown) disposed in the grill opening 172 of the front fascia 170. The grill generally comprises a plurality of grill louvers that may be arranged in any suitable pattern of vertically-extending or cross-car extending louvers, or a combination thereof, or as network comprising a plurality of interconnected polygonal shape cells. The grill defines the aesthetic appearance of the front of the vehicle 10, as well as providing a cover for the grill opening 172 and the grill, particularly the grill louvers, is adapted to provide fluid communication of the airflow 100 into the conduit 102 while limiting or preventing incursion of certain foreign objects into the conduit while the vehicle 10 is being operated. The grill may be formed from any suitable material, including various metals or engineering plastics, or a combination thereof.

Figure 3:
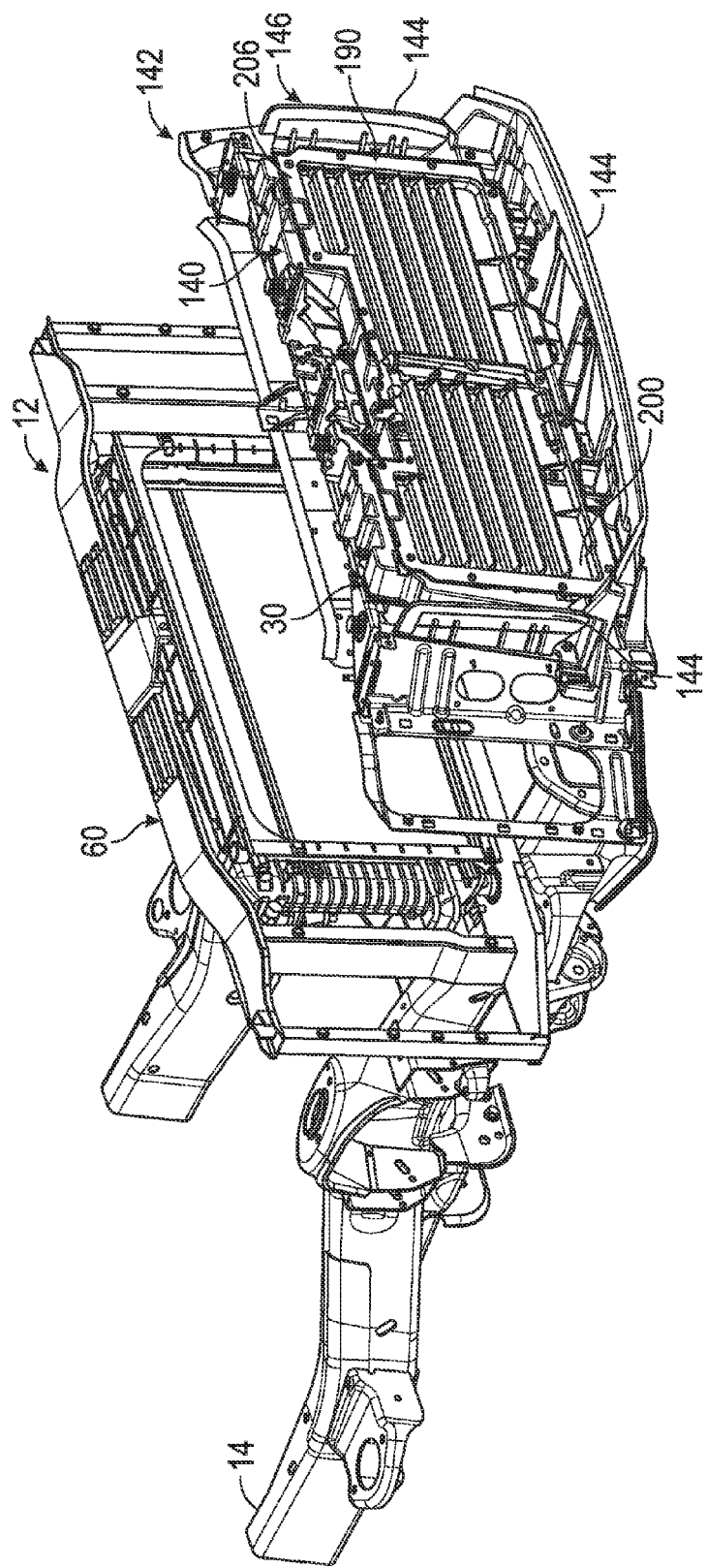
FIG. 3 is a perspective view of the position-controlled front fascia support structure assembly of FIG. 2 having the aero-shutter system further assembled thereto.

In one embodiment, the position-controlled front fascia support structure assembly 142 also includes a vehicle frame 14 and radiator support 60, FIG. 2, wherein the positioning and reinforcement member 30 is attached to the vehicle frame and radiator support and establishes a predetermined position of the position-controlled front fascia support structure assembly 142, FIG. 3, including the positioning and reinforcement member 30, position-controlled front fascia support structure 140, selectively adjustable aerodynamic shutter system 190 and front fascia 170, FIG. 4, in relation to the vehicle frame 14. In one embodiment, a method of assembly of the position-controlled front fascia support structure assembly 142 is illustrated in FIGS. 2-5. The positioning and reinforcement member 30 and position-controlled front fascia support structure 140 may be positioned relative to one another in the manner described herein and illustrated in FIGS. 2, 6, 7 and 11-14 using the position reference features 132. The selectively adjustable aerodynamic shutter system 190 may be positioned over the position-controlled front fascia support structure 140 as shown in FIGS. 2-5 and fixed together as shown in FIGS. 3-4. The positioning and reinforcement member 30, position-controlled front fascia support structure 140, and selectively adjustable aerodynamic shutter system 190 may be brought into proximity and positioned relative to one another as shown in FIG. 2 and fixed to one another as described herein and illustrated in FIG. 3 and then positioned on and fixed to the frame 15 as illustrated in FIGS. 4-5. The fascia 170 may then be positioned proximate the position-controlled front fascia support structure 140 as illustrated in FIG. 4 and attached thereto as illustrated in FIGS. 5 and 14-16.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A fascia support structure for a vehicle, comprising:
   a top portion, the top portion comprising a substantially U-shaped body comprising a top fascia support member, a first side fascia support member and a second side fascia support member, the first side fascia support member having a first side baffle, the second side fascia support member having a second side baffle; and
   a bottom portion attached to the first side fascia support member and the second side fascia support member, the bottom portion comprising a bottom baffle and an integrated locking structure disposed on a surface thereof.

2. The fascia support structure of claim 1, wherein the integrated locking structure comprises a plurality of spaced apart housings disposed on the surface, each of the housings comprising a pair of opposed upstanding sidewalls joined by a top wall that extends between them from an inlet end to an outlet end and an outlet end wall that is joined to the side walls and the top wall, the sidewalls and the top wall defining an inlet opening in the inlet end, the outlet end wall comprising an outlet opening.

3. The fascia support structure of claim 2, wherein the outlet opening comprises a slot that extends between the sidewalls.

4. The fascia support structure of claim 3, wherein the slot has a length and a width, the length being greater than the width, the width being greater in a central portion of the slot than at opposing ends thereof.

5. The fascia support structure of claim 2, wherein each upstanding sidewall has a least one rib extending from the sidewall to the surface of the bottom portion proximate the housing.

6. The fascia support structure of claim 2, wherein the end wall has at least two spaced ribs extending from the end wall to the surface of the bottom portion proximate the housing, the at least two ribs disposed proximate opposing ends of the slot.

7. The fascia support structure of claim 2, wherein a tool access bore extends through the bottom portion proximate the end wall of each of the housings.

8. The fascia support structure of claim 2, wherein the bottom portion includes a boss disposed in the bottom surface within each housing, the boss configured to receive a threaded fastener.

* * * * *